US010524606B2

(12) United States Patent
Mastroyanis (10) Patent No.: US 10,524,606 B2
(45) Date of Patent: Jan. 7, 2020

(54) JUG WITH TEMPERATURE INDICATOR (71) Applicant: INNOVATIONS DEVELOPMENT AUSTRALIA PTY LTD, Hobart, Tasmania (AU)

(72) Inventor: Perry Mastroyanis, Launceston (AU)

(73) Assignee: INNOVATIONS DEVELOPMENT AUSTRALIA PTY LTD, Hobart, Tasmania (AU)

(*) Notice: Subject to any disclaimer, the term of this patent is extended or adjusted under 35 U.S.C. 154(b) by 0 days.

(21) Appl. No.: 15/201,691

(22) Filed: Jul. 5, 2016

(65) Prior Publication Data

US 2016/0309942 A1 Oct. 27, 2016

Related U.S. Application Data (63) Continuation of application No. 13/818,805, filed as application No. PCT/AU2011/001074 on Aug. 22, 2011, now abandoned.

(30) Foreign Application Priority Data

Aug. 26, 2010 (AU) ................. 2010903878

(51) Int. Cl.
*A47J 27/212* (2006.01)
*A47J 31/44* (2006.01)
*G01K 11/16* (2006.01)
*A47G 19/12* (2006.01)

(52) U.S. Cl.
CPC ............ *A47J 27/212* (2013.01); *A47G 19/12* (2013.01); *A47J 31/4485* (2013.01); *G01K 11/165* (2013.01); *G01K 2207/06* (2013.01)

(58) Field of Classification Search
CPC ......... A47G 19/12; A47J 27/212; A47J 27/62; A47J 31/4485; G01K 11/165; G01K 2207/06
See application file for complete search history.

(56) References Cited

U.S. PATENT DOCUMENTS

| 4,773,767 A | 9/1988 | Coll |
| 5,588,747 A | 12/1996 | Blevins |
| 5,738,442 A | 4/1998 | Paron et al. |

(Continued)

FOREIGN PATENT DOCUMENTS

| AU | 2009/101197 | 12/2009 |
| AU | 2009/101190 | 1/2010 |
| JP | 11009415 | 1/1999 |

OTHER PUBLICATIONS

Examination Report for EP11819182.4, dated Jun. 14, 2016; European Patent Office.

(Continued)

*Primary Examiner* — Erik Kashnikow
*Assistant Examiner* — Preston Smith
(74) *Attorney, Agent, or Firm* — Alleman Hall Creasman & Tuttle LLP (57) ABSTRACT A multi-purpose jug with temperature indicator, wherein the jug is formed from a material having high thermal conductivity, including a liquid crystal thermometer attached to a side of the jug, the thermometer being arranged to indicate temperatures of liquid within the jug from 35 degrees Celsius to greater than 65 degrees Celsius, wherein the liquid crystal thermometer is in the form of a label adhered to the external side of the jug and is sealed with a layer of resin covering the label.

8 Claims, 7 Drawing Sheets

(56) References Cited

U.S. PATENT DOCUMENTS

| | | |
|---|---|---|
| 6,324,963 B1 | 12/2001 | Cirasole |
| 2004/0056027 A1 | 3/2004 | Miller |
| 2007/0053406 A1 | 3/2007 | LaGuardia et al. |

OTHER PUBLICATIONS

Second Examination Report for AU2011293081, dated Mar. 2, 2017; Australian Patent Office.
International Search Report for PCT/AU2011/001074, dated Nov. 9, 2011; ISA/AU.
International Preliminary Report on Patentability (with annexes) for PCT/AU2011/001074, completed Jan. 11, 2013; IPEA/AU.
Extended European Search Report for PCT/AU 2011001074, dated Feb. 5, 2014, EPO.
"Circle of Moms" (Warm Milk?), pub. Feb. 2010. http:/fw.Nw.circleofmoms.com/after-pregnancy-babies-and-infants/warm-milk-485627.
Gaifyllia ("How Hot is Lukewarm?"), pub. Feb. 28, 2009. http://web.archive.org/web/20090228042030/http://greekfood.about.eom/od/quenstionsanswers/f/faq_lukewarm.htm.
"My Lot" ("Cold water or lukewarm for drinking"), pub. Aug. 2008. http:/fw.Nw.mylot.com/post/1640121/cold-water-or-lukewarm-for-drinking.
"Temperature Indicators" ("Thermochromic Liquid Crystal Reversible Temperature Indicating Strips"), pub. Mar. 1, 2010. http://temperature-indicators.co.uk\articles/education/reversible_liquid_crystal_strips.htm.

JUG WITH TEMPERATURE INDICATOR

CROSS-REFERENCE TO RELATED APPLICATIONS

This application is continuation of U.S. patent application Ser. No. 13/818,805 filed on Feb. 25, 2013; which is a 371 U.S. National Stage of International Application No. PCT/AU2011/001074, filed Aug. 22, 2011; which claims priority to Australian Patent Application No. 2010903878, filed Aug. 26, 2010, the disclosures of which are herein incorporated by reference in their entirety.

FIELD

The invention relates to a jug with a temperature indicator, and more particularly, but not exclusively, to a jug with a temperature indicator which is suitable for steaming milk in the process of preparing coffee for consumption.

BACKGROUND

It is known to prepare coffee beverage for consumption by steaming milk so as to make coffee beverages in the styles of cappuccino, cafe latte and the like. It is known that the temperature to which the milk is heated is critical in order to optimise the quality of the steamed milk. For this purpose, it is common to insert a separate conventional probe-type thermometer into the milk during steaming so that the milk can be brought to the correct temperature. However, using a probe type thermometer in this way can be inconvenient, and can also cause cross contamination.

U.S. Pat. No. 6,324,963 and Australian Patent No. 2009101190 have proposed milk frothing jugs with temperature indicators, however the applicant has identified that the utility of these previously proposed jugs is quite limited, and that the longevity may also be limited. More particularly, with reference to Australian Patent No. 2009101190, the milk frothing jug has a temperature indicator which indicates milk inside the jug being brought to only a single specific temperature. Also, the temperature indicator is attached to the jug in the form of a label which will deteriorate over time and will be likely to be separated from the jug through repeated use of the jug and repeated dishwasher cycles.

The applicant has identified that there are significant limitations to existing milk frothing jugs, and that it would be beneficial to provide an improved jug with temperature indicator which would be suitable for an expanded range of applications and would have an improved longevity.

Examples of the present invention seek to provide a jug with temperature indicator which overcomes or at least alleviates one or more disadvantages associated with previous milk frothing jugs.

SUMMARY

In accordance with one aspect of the present invention, there is provided a multi-purpose jug with temperature indicator, wherein the jug is formed from a material having high thermal conductivity, including a liquid crystal thermometer attached to a side of the jug, the thermometer being arranged to indicate temperatures of liquid within the jug from 35 degrees Celsius to greater than 65 degrees Celsius, wherein the liquid crystal thermometer is in the form of a label adhered to the external side of the jug.

Preferably, the label is sealed with a layer of resin covering the label.

Preferably, the material is stainless steel.

Preferably, the thermometer is arranged to indicate temperatures of liquid within the jug from 35 degrees Celsius to 85 degrees Celsius.

Preferably, the liquid crystal thermometer has a series of separate cells which indicate specific temperatures in predetermined intervals.

In accordance with another aspect of the present invention, there is provided a method of using a multi-purpose jug as described above, including the steps of heating/cooling water in the jug using the liquid crystal thermometer to bring the water to a temperature of approximately 35 degrees Celsius for making dough, and steaming milk in the jug using the liquid crystal thermometer to bring the milk to a temperature of approximately 65 degrees Celsius.

DRAWINGS

The invention is described, by way of non-limiting example only, with reference to the accompanying drawings, in which.

DETAILED DESCRIPTION

With reference to FIGS. 1 to 7 of the drawings, there is shown a jug 10 with a temperature indicator 12 which is suitable for frothing milk in the preparation of coffee beverages for consumption. The jug 10 is formed from a material having high thermal conductivity, and includes the temperature indicator 12 in the form of a liquid crystal thermometer 14 attached to an external side of the jug 10. The thermometer 14 is arranged to indicate temperatures of liquid within the jug 10 from 35° C. to greater than 65° C. The liquid crystal thermometer 14 is in the form of a label adhered to the external side of the jug 10, and is sealed with a layer of resin 16 covering the label.

In the example of the invention depicted in the drawings, the material of the jug 10 is stainless steel, which has high thermal conductivity such that the temperature of the liquid within the jug is readily transmitted to the liquid crystal thermometer 14 such that the temperature shown on the thermometer 14 is accurate. The example depicted in the drawings has the liquid crystal thermometer 14 arranged to indicate temperatures of liquid within the jug 10 from 35° C. to 85° C. More specifically, the liquid crystal thermometer 14 has a series of separate cells 18 which indicate specific temperatures in predetermined intervals. The arrangement shown has sufficient cells 18 to indicate temperatures in 5°

C. intervals from the lower bound of 35° C. to the upper bound of 85° C., with each cell being associated with a specific temperature. However, due to the nature of operation of the cells 18, temperatures within each interval can be identified by the change in appearance, particularly in the change of colour, of the neighbouring cell or cells 18.

Although the preferred example depicted in the drawings has the lower bound of 35° C. and the upper bound of 85° C., it will be appreciated by people skilled in the art that different values may be used provided the range of 35° C. to 65° C. is accounted for. In particular, the applicant has identified that it would be useful for the jug 10 to have utility in identifying the correct temperature of water to be used in the preparation of dough, for example for making pizza or bread. For this application, the optimum temperature is just greater than 35° C., that being the temperature at which yeast will start to react. It is important for the temperature to be accurate, as yeast will die in temperature above 45° C. to 50° C. In addition to being useful for identifying the correct temperature of water for the preparation of dough, the jug 10 is also useful for identifying the correct temperature of steamed milk for the preparation of coffee beverages, which has been found to be in the order of 65° C.

Figure 1:
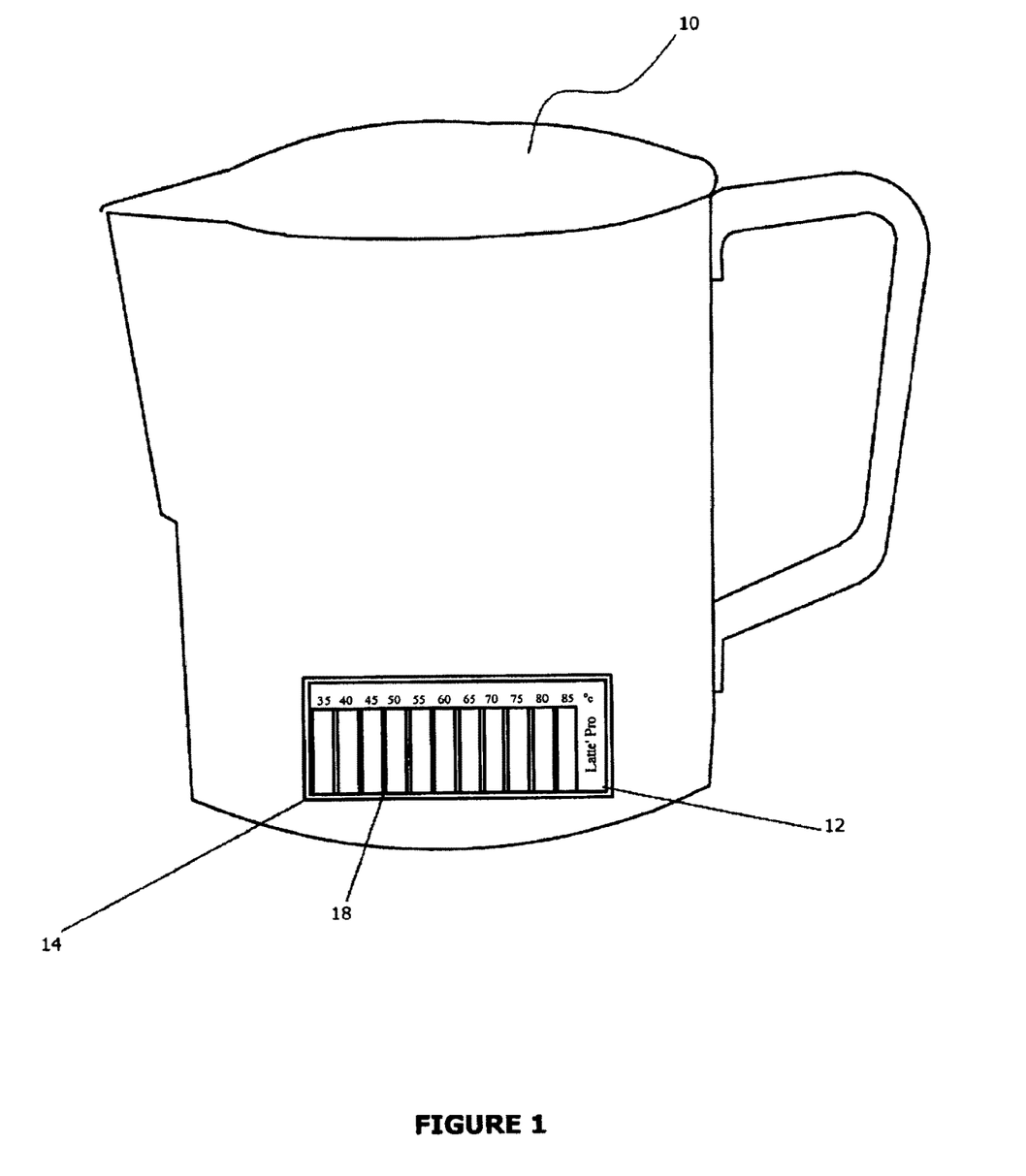
FIG. 1 is a side view of a jug with temperature indicator in accordance with an example of the present invention.
Figure 2:
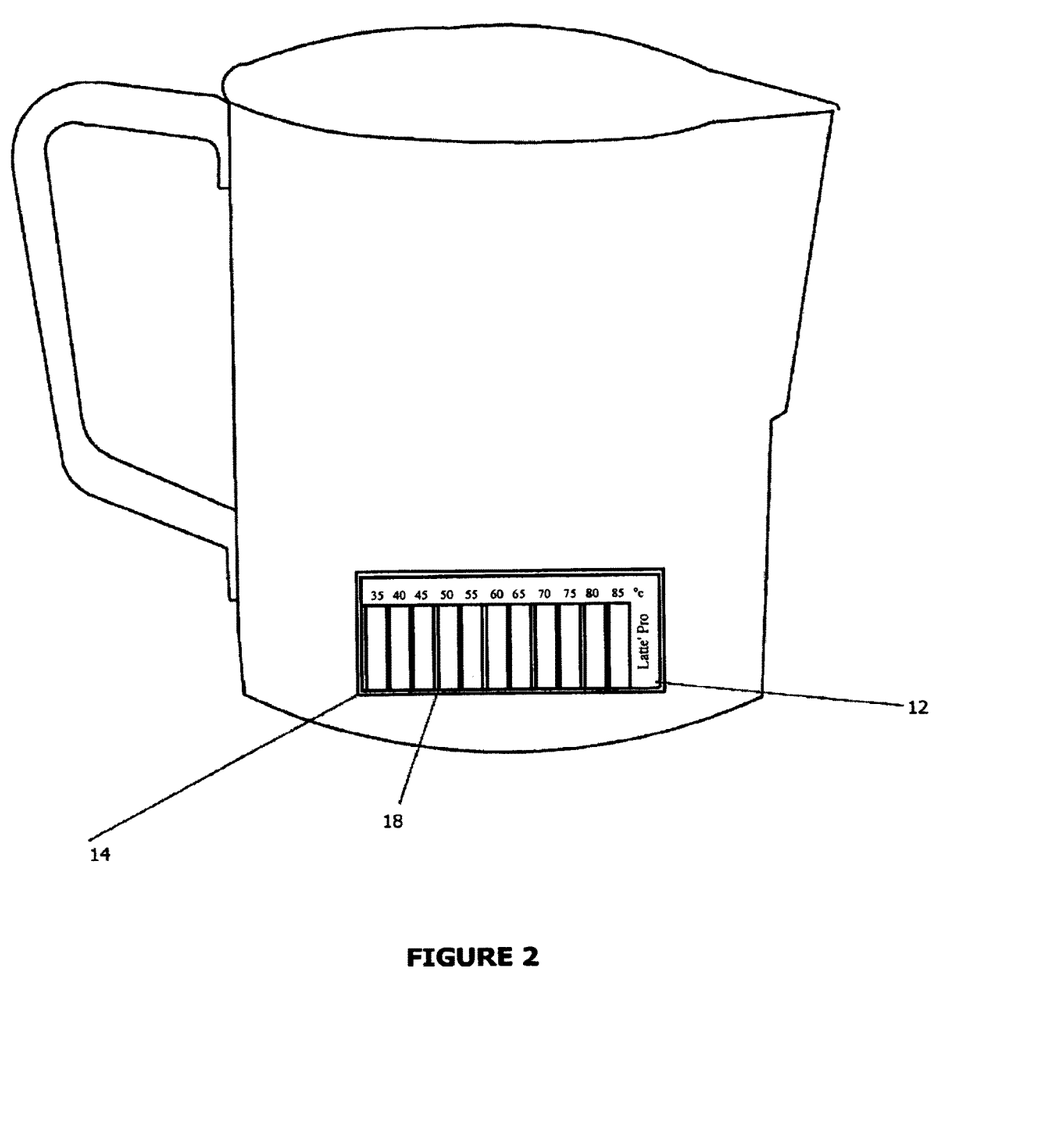
FIG. 2 is an opposite side view of the jug shown in FIG. 1.
Figure 3:
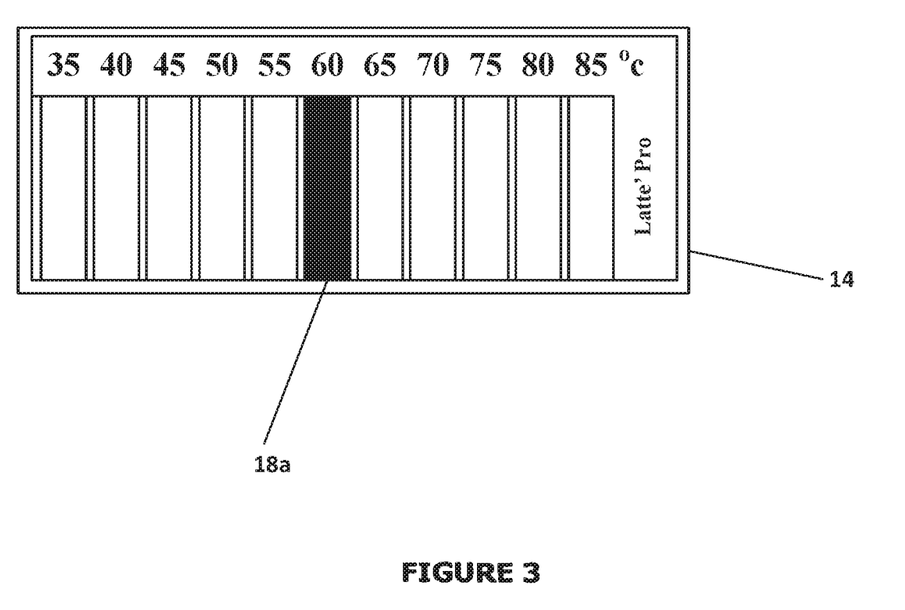
FIG. 3 is a detailed view of the temperature indicator of the jug shown in FIGS. 1 and 2.

FIG. 3 shows a detailed view of the liquid crystal thermometer 14 in which the cell 18a associated with the temperature of 60° C. may be represented in a different colour, or may change to a different colour, so that the user can readily identify that the frothed milk is at the correct temperature. In a similar manner, the cell associated with the temperature of 35° C. and/or the cell associated with the temperature of 40° C. may be coloured differently so that the user may also readily identify the correct temperature in the preparation of water for making dough. The liquid crystal thermometer 14 may be labelled with a brand such as "Latte pro", as shown.

Figure 4:
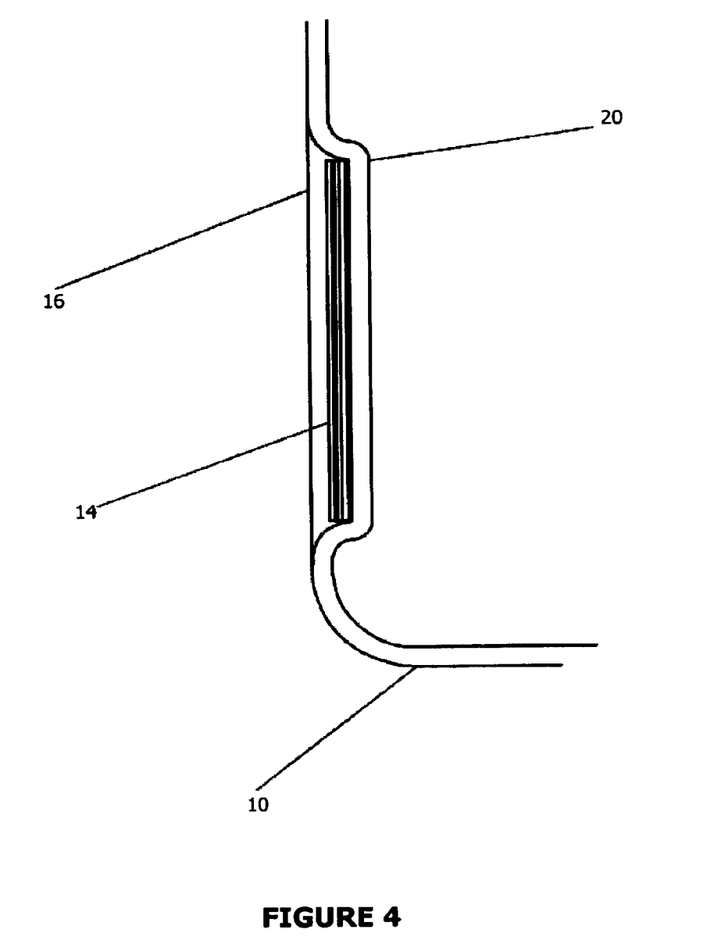
FIG. 4 is a detailed cross-sectional view of the temperature indicator attached to the jug, in accordance with one example.
Figure 5:
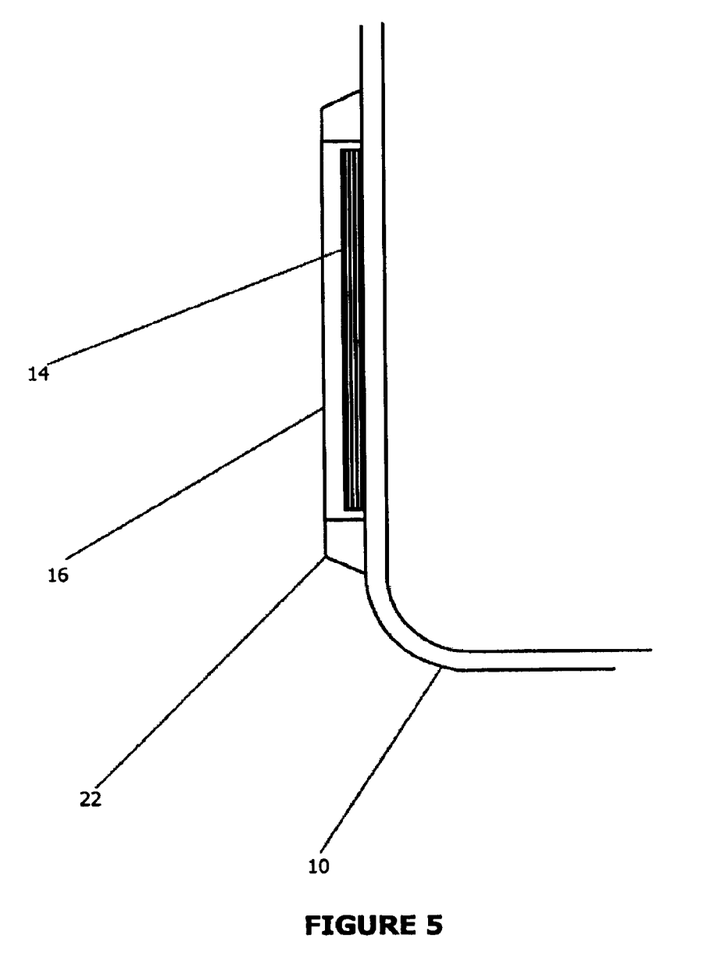
FIG. 5 is a detailed cross-sectional view of the temperature indicator attached to the jug in accordance with another example.
Figure 6:
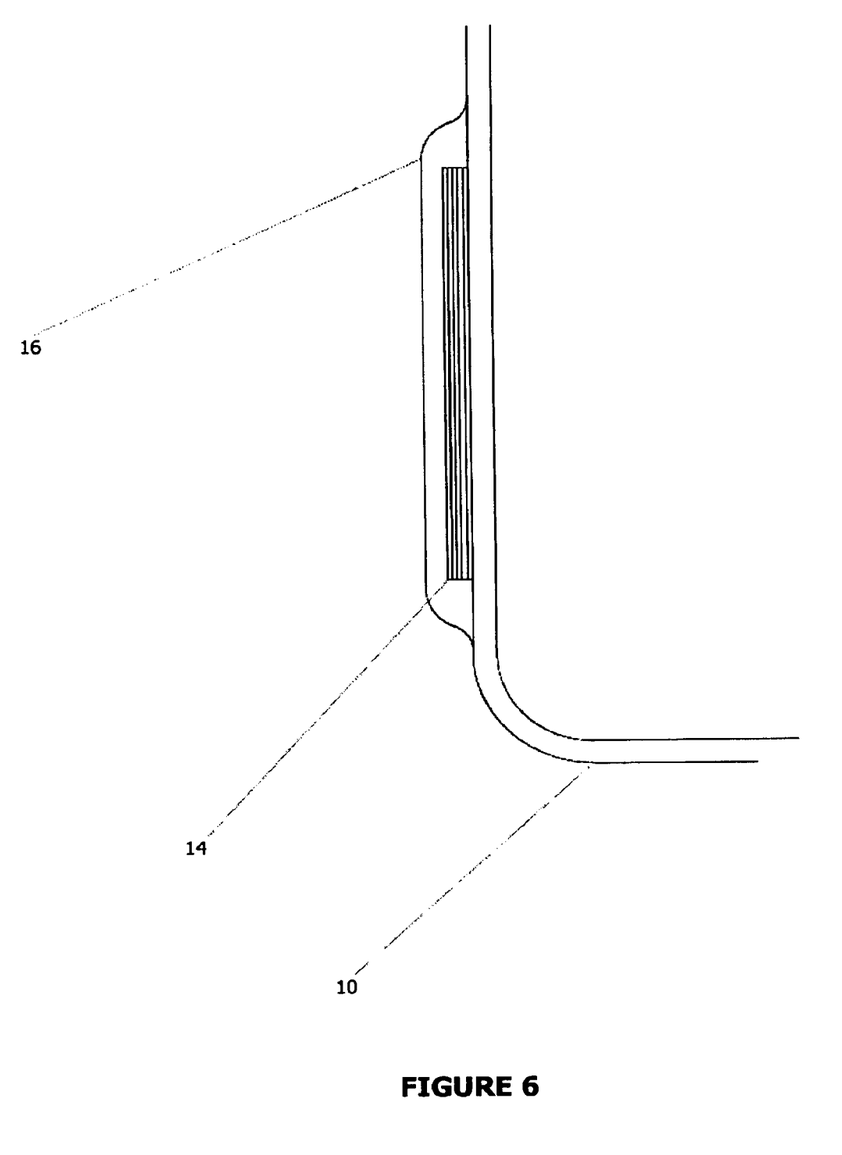
FIG. 6 is a detailed cross-sectional view of the temperature indicator attached to the jug in accordance with yet another example.

FIGS. 4 to 6 show different examples of detailed cross-sectional views of attachment of the liquid crystal thermometer 14 to the jug 10. In each example, a layer of resin 16 is used to cover the liquid crystal thermometer 14 so as to prevent it from being removed during repeated cycles of use of the jug 10, which will include fluctuations in temperatures and harsh conditions, particularly in dishwashers. Specifically, in FIG. 4, the liquid crystal thermometer 14 is housed within an indentation 20 formed in a side of the jug 10 with the layer of resin 16 being applied over the liquid crystal thermometer so as to be flush with the surrounding surface of the jug 10. With reference to FIG. 5, the jug 10 is provided with a stainless steel frame 22 which surrounds and protects the liquid crystal thermometer 14. In this case, the resin 16 is formed in a layer which is flush with the surrounding frame 22. In FIG. 6, the liquid crystal thermometer 14 is applied to the side of the jug 10, without an indentation or a frame 22. In this case, the liquid crystal thermometer 14 is covered by a layer of resin 16 which extends over each extremity of the liquid crystal thermometer 14 so as to protect the thermometer 14 from inadvertent removal.

Figure 7:
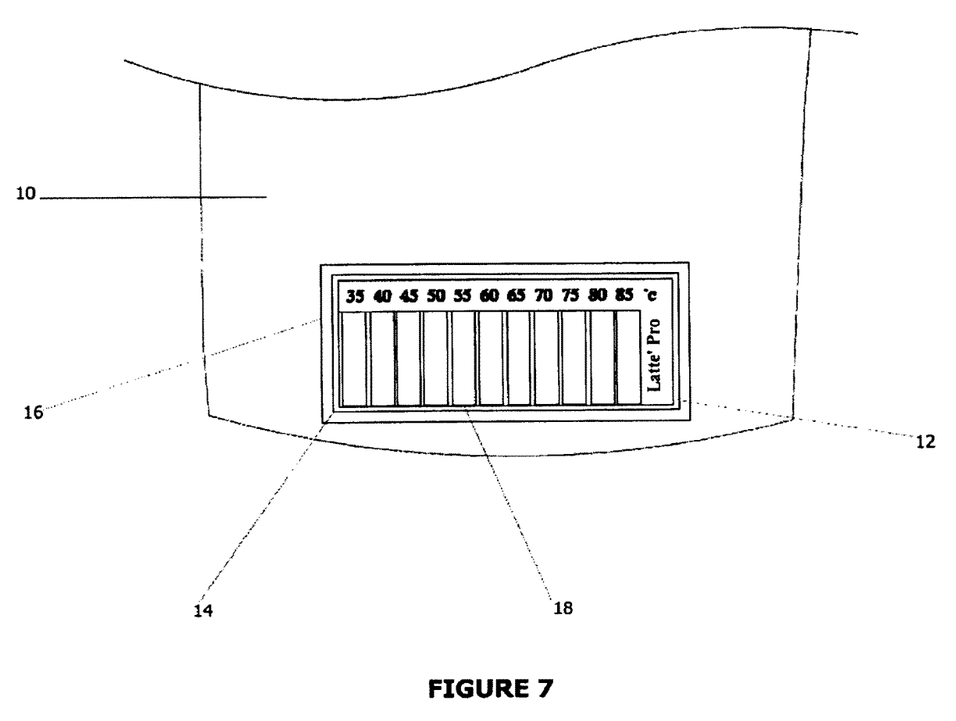
FIG. 7 is a detailed view of a lower portion of the jug shown in FIGS. 1 and 2.

FIG. 7 shows a detailed side view of a lower portion of the jug 10 with the liquid crystal thermometer 14 attached.

Advantageously, the applicant has identified that 5° C. intervals between the cells is beneficial as the nature of operation of the cells enables temperatures within each 5° C. interval to be identifiable by the change in colour of the neighbouring cell or cells. Owing to definite changes in colour of the cells, it is possible to accurately determine temperature of the liquid within the jug in 2.5° C. increments. A specific temperature point midway between the numerical labels of the cells is attained when the upper of the two cells changes colour a first time. For example, when the 65° C. cell changes colour the first time, it has detected a temperature of 62.5° C. (midway between the 60° C. and 65° C. cells)—when the same cell changes colour again (a second time), it has detected a temperature of 65° C. For example, the first change of colour may be the cell changing colour from black to brown, and the second change of colour may be the cell changing colour from brown to green. The ability to measure temperature relatively accurately in 2.5° C. increments enhances the ability of the user to avoid temperature overshoot and to attain the correct temperature of the liquid within the jug.

Furthermore, for the purpose of heating milk, the applicant has identified that it is advantageous to begin the range of the liquid crystal thermometer at 35° C., rising progressively to at least 65° C. such that the operator is able to monitor the rate of change of the temperature of the milk as it is heated such that the jug can be removed from the steamer without overshooting the desired temperature. Also, the jug preferably includes a container formed of unitary construction of stainless steel, with a handle attached to the container to protect the operator from burning his or her hands during use, which would otherwise be possible due to the high thermal conductivity of the container. The unitary nature of construction of the container promotes longevity, homogenous temperature of the milk within the container, accurate detection of the temperature by the thermometer, and efficient heating of the milk.

It will be appreciated by those skilled in the art that examples of the invention may be used for heating liquids other than milk.

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

What is claimed is:

1. A jug comprising:
    a highly thermally conductive material; and
    a temperature indicator comprising a liquid crystal thermometer attached to an external side of the jug and operable to indicate a temperature of a liquid contained within the jug from 35 degrees Celsius to greater than 65 degrees Celsius;
    wherein the liquid crystal thermometer is a label adhered to the external side of the jug having a series of separate cells positioned adjacent to one another, each cell of which indicates a specific temperature such that the liquid crystal thermometer indicates a series of specific temperatures in predetermined intervals;

wherein each cell of the series of separate cells is configured to change from an initial state to a first color when a temperature of the liquid contained within the jug equals a temperature point midway between a temperature assigned to that cell and a lower temperature assigned to a first adjacent cell, and to change from the first color to a second color when the temperature of the liquid contained within the jug equals the temperature assigned to that cell while a second adjacent cell assigned a higher temperature maintains its initial state, such that the temperature of the liquid is indicated by a color of one cell; and wherein each cell maintains the initial state until it changes to the first color, and each cell maintains the first color until it changes to the second color.

2. The jug as claimed in claim 1, wherein the material is stainless steel.

3. The jug as claimed in claim 1, wherein the label adhered to the external side of the jug is sealed with a layer of resin covering the label.

4. A method of using the jug as claimed in claim 1, wherein the method comprises:

heating and/or cooling water in the jug;

using the liquid crystal thermometer to determine when the water is brought to a temperature of approximately 35 degrees Celsius such that the water is at a temperature suitable for making dough;

using the liquid crystal thermometer to determine a temperature of the water during the heating and/or cooling;

steaming milk in the jug;

using the liquid crystal thermometer to determine when the milk is brought to a temperature of approximately 65 degrees Celsius; and using the liquid crystal thermometer to determine a temperature of the milk during the steaming.

5. The jug as claimed in claim 1, wherein the liquid crystal thermometer is operable to indicate a temperature of liquid contained within the jug from 35 degrees Celsius to 85 degrees Celsius.

6. The jug as claimed in claim 1, wherein one cell of the series of separate cells is associated with the temperature of 60 degrees Celsius; and wherein the one cell is represented in a color different from the remainder of the cells of the series of separate cells so that a user can readily identify that liquid contained within the jug is at a temperature suitable for use.

7. A jug comprising:

a container having a unitary construction of stainless steel and comprising a side wall;

a handle attached to the side wall of the container;

a temperature indicator comprising a liquid crystal thermometer attached to an exterior surface of the side wall, the liquid crystal thermometer operable to indicate a temperature of liquid within the container over a temperature range from 35 degrees Celsius to 85 degrees Celsius;

wherein the liquid crystal thermometer is a label adhered to the exterior surface of the side wall and sealed to the external side of the container with a layer of resin covering the label;

wherein the liquid crystal thermometer has a series of individual cells positioned adjacent to one another, each cell of which indicates a specific temperature within the temperature range, and wherein the specific temperatures indicated by the adjacent cells are separated by a predetermined temperature interval;

wherein each cell of the series of individual cells is configured to change from an initial state to a first color when a temperature of the liquid contained within the jug equals a temperature point midway between a temperature assigned to that cell and a lower temperature assigned to a first adjacent cell, and to change from the first color to a second color when the temperature of the liquid contained within the jug equals the temperature assigned to that cell while a second adjacent cell assigned a higher temperature maintains its initial state, such that the temperature of the liquid is indicated by a color of one cell;

wherein each cell maintains an initial state until it changes to a first color, and each cell maintains the first color until it changes to a second color;

wherein one cell of the series of individual cells is associated with the specific temperature of 60 degrees Celsius; and wherein the one cell is adapted to change to the second color unique from the second colors of a remainder of the cells so that a user can readily identify that liquid contained within the container is at a temperature suitable for use.

8. The jug as claimed in claim 1, wherein the predetermined intervals occur in five degree increments.

* * * * *